United States Patent
Zhang

(10) Patent No.: US 12,098,741 B2
(45) Date of Patent: Sep. 24, 2024

(54) PRE-EMBEDDED ANTI-LOOSENING NUT

(71) Applicants: Maintek Computer (Suzhou) Co., Ltd., JiangSu (CN); PEGATRON CORPORATION, Taipei (TW)

(72) Inventor: Changlin Zhang, JiangSu (CN)

(73) Assignees: Maintek Computer (Suzhou) Co., Ltd., JiangSu (CN); PEGATRON CORPORATION, Taipei (TW)

( * ) Notice: Subject to any disclaimer, the term of this patent is extended or adjusted under 35 U.S.C. 154(b) by 201 days.

(21) Appl. No.: 17/842,738

(22) Filed: Jun. 16, 2022

(65) Prior Publication Data

US 2023/0057727 A1 Feb. 23, 2023

(30) Foreign Application Priority Data

Aug. 19, 2021 (CN) .......................... 202110955102.9

(51) Int. Cl.
*F16B 37/00* (2006.01)
*F16B 37/04* (2006.01)

(52) U.S. Cl.
CPC ................................. *F16B 37/048* (2013.01)

(58) Field of Classification Search
CPC .................................................... F16B 37/048
USPC ................................................ 411/429, 901
See application file for complete search history.

(56) References Cited

U.S. PATENT DOCUMENTS

| | | | | |
|---|---|---|---|---|
| 3,384,142 A * | 5/1968 | Phelan | ...................... | F16B 5/01 |
| | | | | 411/968 |
| 4,800,643 A * | 1/1989 | Higgins | ................ | F16B 13/141 |
| | | | | 264/273 |
| 4,883,399 A * | 11/1989 | MacLean | .............. | F16B 33/006 |
| | | | | 411/908 |
| 5,092,550 A * | 3/1992 | Bettini | .................... | E05F 5/022 |
| | | | | 248/188.4 |
| 5,240,543 A * | 8/1993 | Fetterhoff | ................. | F16B 5/01 |
| | | | | 428/116 |
| 10,047,784 B2 * | 8/2018 | Yamaguchi | ........... | F16B 37/122 |
| 10,099,767 B2 * | 10/2018 | Lewis | ....................... | F16B 5/01 |
| 10,690,172 B2 * | 6/2020 | Chen | ..................... | F16B 37/048 |
| 10,813,237 B2 * | 10/2020 | Schwarz | ................ | H05K 5/061 |
| 2002/0090900 A1 * | 7/2002 | Telischak | ................ | B24D 9/08 |
| | | | | 451/359 |
| 2012/0070226 A1 * | 3/2012 | Su | ........................ | F16B 37/122 |
| | | | | 403/334 |
| 2016/0195124 A1 * | 7/2016 | Stumpf | ................. | F16B 37/048 |
| | | | | 264/249 |
| 2017/0108028 A1 * | 4/2017 | Yamauchi | ............. | F16B 37/068 |

FOREIGN PATENT DOCUMENTS

CN 206626075 11/2017

* cited by examiner

*Primary Examiner* — Gary W Estremsky
(74) *Attorney, Agent, or Firm* — J.C. PATENTS

(57) ABSTRACT

The disclosure provides a pre-embedded anti-loosening nut embedded in a plastic component. The pre-embedded anti-loosening nut includes a main body portion and a plurality of radiating portions. The main body portion has a threaded hole. The radiating portions are disposed around a periphery of the main body portion. Each of the radiating portions has a first side and a second side connected with each other. The first side and the second side form a first included angle, and the second side is connected with the first side of another adjacent radiating portion to form a second included angle.

5 Claims, 2 Drawing Sheets

PRE-EMBEDDED ANTI-LOOSENING NUT

CROSS-REFERENCE TO RELATED APPLICATION

This application claims the priority benefit of China application serial no. 202110955102.9, filed on Aug. 19, 2021. The entirety of the above-mentioned patent application is hereby incorporated by reference herein and made a part of this specification.

BACKGROUND

Technical Field

The disclosure relates to a pre-embedded anti-loosening nut which is embedded in a plastic component and not easily loosened.

Description of Related Art

Electronic or 3C (computer, communication, and consumer) products usually embed nuts of copper or other materials in plastic components for assembly and locking at later stages. For example, in laptops or tablet computers, nuts are often used.

In the laptops or tablet computers used by the user, the assembly of parts such as the battery and the bottom cover is usually carried out from the bottom. The common assembly method is to pre-embed nuts in the plastic casing or plastic components. Since the shape of the nuts is mostly circular or hexagonal, after repairing or replacing the internal parts for multiple times, the nuts that are being repeatedly used for locking and loosening the screws together would inevitably rotate in the plastic component due to too large torque when the screw is locked or loosened, which causes the surrounding plastic to be damaged thus to make the nuts loosened from the plastic component.

One method is to place small serrations on the periphery of the nut, and the force of fixing the nut in the plastic component is strengthened through the meshing of the serrations with the plastic component. However, the tiny serrations around the nut do not provide much resistance to the nut itself. On the contrary, when the nut is subjected to a relatively large locking torque, the serrations meshed with the plastic component cause the surrounding plastic components to be damaged more seriously. The nut itself is damaged and disengaged from the plastic component, and further it is also more difficult to repair the damaged parts of the plastic component.

SUMMARY

The disclosure relates to a pre-embedded anti-loosening nut which is embedded in a plastic component and not easily loosened.

A pre-embedded anti-loosening nut embedded in a plastic component according to the disclosure includes a main body portion and multiple radiating portions. The main body portion has a threaded hole. The radiating portions are disposed around a periphery of the main body portion. Each of the radiating portions has a first side and a second side. The first side and the second side form a first included angle, and the second side is connected with the first side of another adjacent radiating portion to form a second included angle.

In the pre-embedded anti-loosening nut according to the embodiment of the disclosure, the second side of the radiating portion and the first side of the another adjacent radiating portion may be neither parallel nor perpendicular to each other.

In the pre-embedded anti-loosening nut according to the embodiment of the disclosure, the first included angle may be an acute angle, and the second included angle may be an obtuse angle.

In the pre-embedded anti-loosening nut according to the embodiment of the disclosure, a height of each of the radiating portions may be greater than or equal to a diameter of the threaded hole.

In the pre-embedded anti-loosening nut according to the embodiment of the disclosure, the radiating portions may be disposed around the periphery of the main body portion at equal intervals.

In the pre-embedded anti-loosening nut according to the embodiment of the disclosure, along a thickness direction of the main body portion, the threaded hole may have a first opening on a top surface of the main body portion, and the threaded hole may have a second opening on a bottom surface of the main body portion. A center of the first opening may be eccentric to a center of the second opening.

To sum up, the special shape of the above-mentioned pre-embedded anti-loosening nut can effectively prevent itself from being loosened from the plastic component.

DETAILED DESCRIPTION OF DISCLOSED EMBODIMENTS

Figure 1:
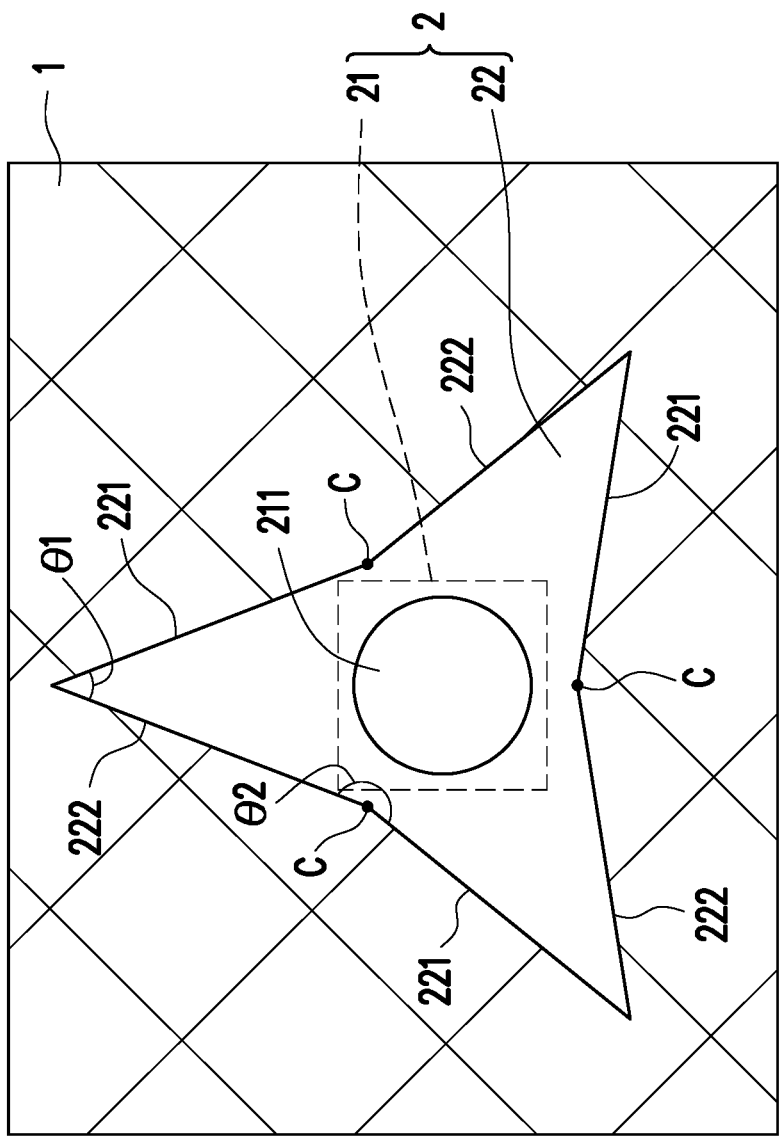
FIG. 1 is a top view of a pre-embedded anti-loosening nut embedded in a plastic component according to one embodiment of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

Figure 2:
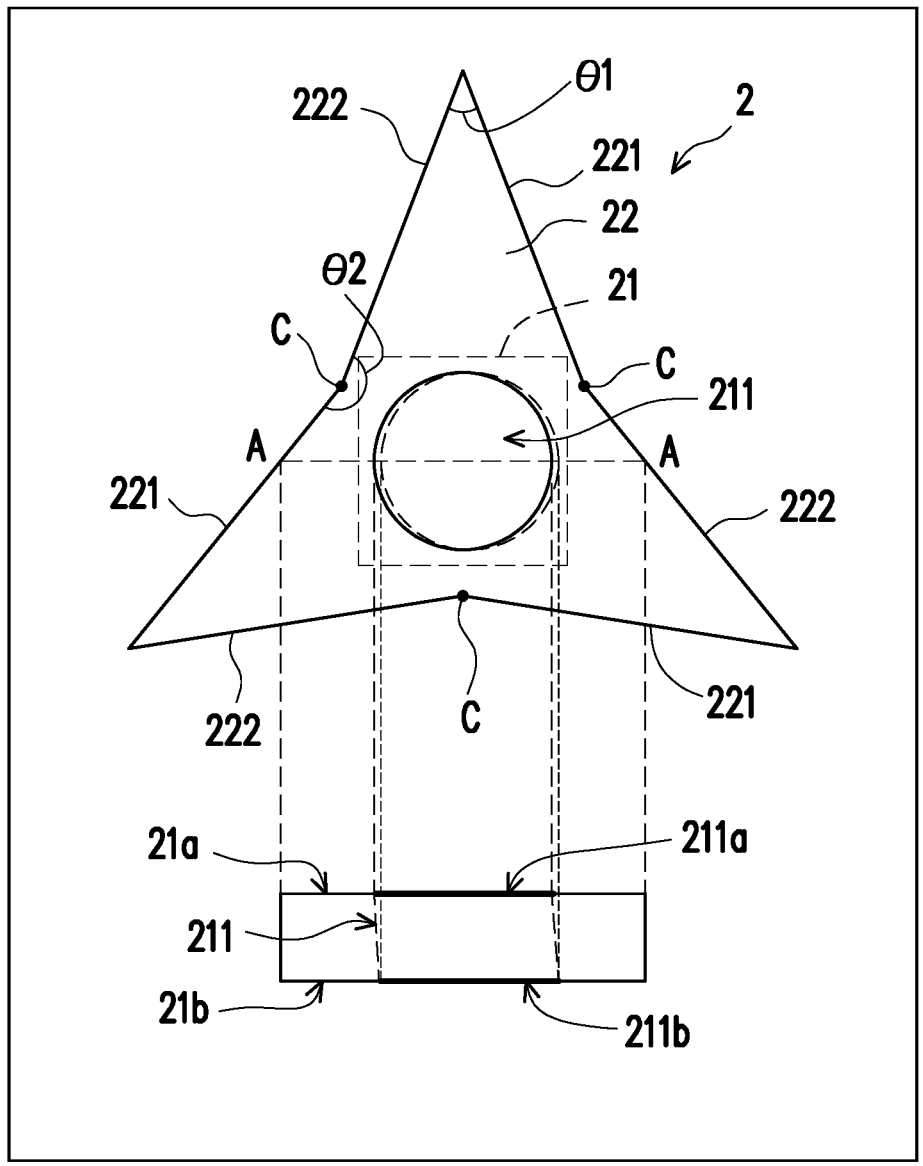
FIG. 2 is a schematic view of a pre-embedded anti-loosening nut.

FIG. 1 is a top view of a pre-embedded anti-loosening nut embedded in a plastic component according to one embodiment of the disclosure. FIG. 2 is a schematic view of a pre-embedded anti-loosening nut. Please refer to FIG. 1 and FIG. 2 at the same time. A pre-embedded anti-loosening nut 2 embedded in a plastic component 1 includes a main body portion 21 and a plurality of radiating portions 22. The shape of the main body portion 21 is not limited, and the main body portion 21 has a threaded hole 211 for receiving a locking member (not shown). The locking member may be a screw. The radiating portions 22 are disposed around the periphery of the main body portion 21. Each of the radiating portions 22 has a first side 221 and a second side 222. The first side 221 and the second side 222 form a first included angle $\theta1$, and the second side 222 of a radiating portion 22 is connected with the first side 221 of another adjacent radiating portion 22 to form a second included angle $\theta2$.

The above-mentioned radiating portions 22 are disposed around the periphery of the main body portion 21 at equal intervals. The second side 222 of the radiating portion 22 and the first side 221 of the another adjacent radiating portion 22 are neither parallel nor perpendicular to each other. In this embodiment, the first included angle $\theta1$ is an acute angle, and the second included angle $\theta2$ is an obtuse angle. In addition, the height of each of the radiating portions 22 may be greater than or equal to the diameter of the threaded hole 211.

The first side 221 and the second side 222 are oblique sides, and the slope changes at a connection point C of the second side 222 of the radiating portion 22 and the first side 221 of the another adjacent radiating portion 22. Accordingly, it may be seen from FIG. 1 and FIG. 2 that the connection point C is an inflection point between the second side 222 of the radiating portion 22 and the first side 221 of the another adjacent radiating portion 22 connected thereto.

By changing the design of the pre-embedded anti-loosening nut 2, the pre-embedded anti-loosening nut 2 has a radiating portion 22 that is similar to a triangle and is radially disposed relative to the main body portion 21. The first side 221 and the second side 222 of each of the radiating portions 22 may be closely attached to the plastic component 1. Accordingly, when the pre-embedded anti-loosening nut 2 is subjected to a large torsional impact, the pre-embedded anti-loosening nut 2 may resist the impact by relying on the contact surface between the radiating portion 22 and the plastic component 1. Thus, it is less likely that the pre-embedded anti-loosening nut 2 in the plastic component 1 rotates relative to the plastic component 1 to cause damage to the plastic component 1.

In addition, the radiating portion 22 that is similar to a triangular shape is used to facilitate a manipulator in grasping the pre-embedded anti-loosening nut 2, which is beneficial to an automation process.

In addition, the radiating portion 22 that is similar to a triangular shape is used further to facilitate the assembler to process the radiating portion 22 according to the actual situations at later stages to form a polygonal radiating portion 22.

Incidentally, although the shape of the radiating portion 22 is not limited to a triangle, it may also be modified into a polygon according to requirements. However, it should be noted that the more sides of the polygon, the closer the shape of the pre-embedded anti-loosening nut 2 is to a circle. In this situation, the circular nut as described in the related art is easily loosened from the plastic component 1 due to excessive torque. Accordingly, the shape of the radiating portion 22 is preferably triangular.

In addition, along a thickness direction of the main body portion 21, the threaded hole 211 has a first opening 211a on a top surface 21a of the main body portion 21, and the threaded hole 211 has a second opening 211b on a bottom surface 21b of the main body portion 21. A center of the first opening 211a is eccentric to a center of the second opening 211b, that is, the first opening 211a and the second opening 211b are eccentrically disposed. Accordingly, the locking force of the locking member (screw) may be strengthened when the screw and the pre-embedded anti-loosening nut 2 are locked together.

To sum up, the pre-embedded anti-loosening nut of the preferred embodiment of the disclosure may not be easily damaged and loosened after assembly and may not damage the plastic component, and the screw may not be easily loosened. Specifically, most of the conventional pre-embedded nuts are circular, and even if there are evenly distributed serrations around the periphery, holistically it is still circular. Accordingly, the conventional pre-embedded nuts still rotate in the plastic hole when the stress is too big. In contrast, the pre-embedded anti-loosening nut of the embodiment of the disclosure includes radiating portions, and the shape of the pre-embedded anti-loosening nut may provide a good stress environment. When the torque is large, the pre-embedded anti-loosening nut does not easily rotate with the locking member to damage the plastic component. In this way, the pre-embedded anti-loosening nut may be prevented from being loosened from the plastic component, and further the integrity of the plastic component may be maintained.

In addition, the shape of the pre-embedded anti-loosening nut may facilitate grasping of the manipulator, which is beneficial to an automation process.

Furthermore, the assembler may process the radiating portions more conveniently according to the actual situations at later stages, thus providing the convenience of use and compatibility.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

What is claimed is:

1. A pre-embedded anti-loosening nut embedded in a plastic component, comprising:
   a main body portion having a threaded hole; and
   a plurality of radiating portions disposed around a periphery of the main body portion, wherein each of the radiating portions has a first side and a second side connected with each other, the first side and the second side form a first included angle, and the second side is connected with the first side of another adjacent radiating portion to form a second included angle,
   wherein the first included angle is an acute angle, and the second included angle is an obtuse angle.

2. The pre-embedded anti-loosening nut according to claim 1, wherein the second side of the radiating portion and the first side of the another adjacent radiating portion are neither parallel nor perpendicular to each other.

3. The pre-embedded anti-loosening nut according to claim 1, wherein a height of each of the radiating portions is greater than or equal to a diameter of the threaded hole.

4. The pre-embedded anti-loosening nut according to claim 1, wherein the radiating portions are disposed around the periphery of the main body portion at equal intervals.

5. The pre-embedded anti-loosening nut according to claim 1, wherein along a thickness direction of the main body portion, the threaded hole has a first opening on a top surface of the main body portion, the threaded hole has a second opening on a bottom surface of the main body portion, and a center of the first opening is eccentric to a center of the second opening.

* * * * *